Oct. 21, 1969  J. L. RAKES ETAL  3,474,165
METHOD OF ROTATIONAL MOLDING
Filed Sept. 15, 1966
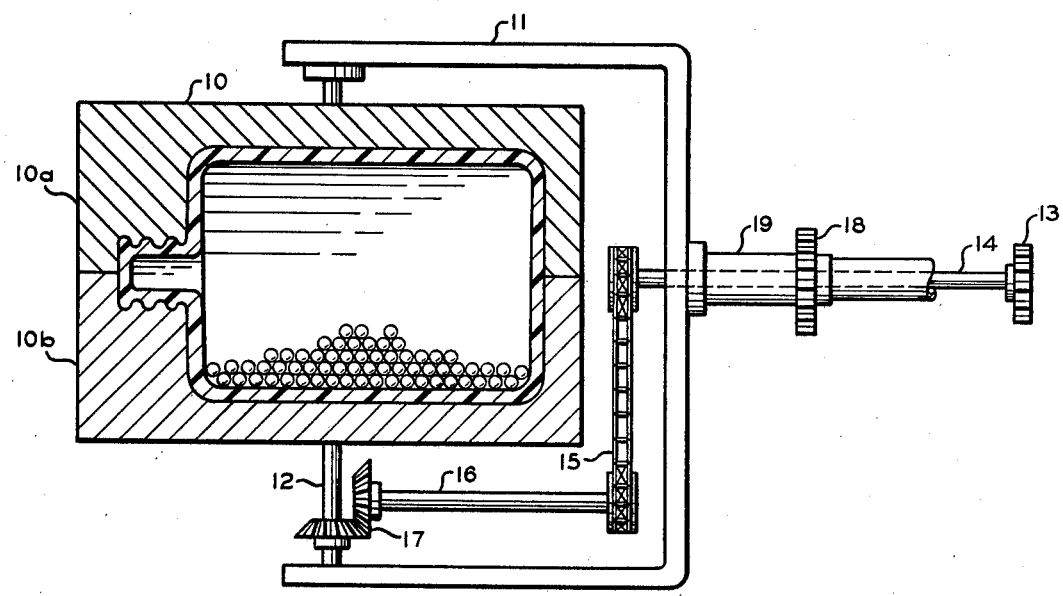
INVENTOR
J. L. RAKES
R. L. REES
E. C. HELD, JR.
BY
*Young & Quigg*
ATTORNEYS ically, rotational molding, even up to temperatures at which deterioration of the resins begins.

Attempts to rotationally mold thermoplastic materials of high molten viscosity result in incomplete fusing of the adjacent particles of softened resin. Depending upon the character of the resin, the articles produced display defects ranging from increased surface roughness and bubble formation to actual porosity of the molded article.

It is therefore an object of this invention to provide a method for rotational molding resins having a high molten viscosity. It is a further object of this invention to provide an improved method of compacting the walls of rotationally molded items. It is a still further object of this invention to provide rotationally molded articles having high wall density.

Other aspects, objects, and the several advantages of this invention will be apparent to one skilled in the art from a study of this disclosure, drawing and the appended claims.

According to our invention, the rotational molding process is improved by placing into the mold one or more dense compacting elements, such as stainless steel balls, which serve to aid in forcing the plastic to flow evenly along the walls of the mold, and compact the material against the walls of the mold, providing a relatively dense smooth finished interior and exterior surface to the molded article.

The compacting elements will generally be spheroidal in shape, but could be cylindrical, elliptical, or even irregularly shaped.

Several different materials could be used for constructing the compacting elements. The major requirement is that the material used not affect the plastic being molded. Stainless steel will generally be preferred because of its high density and inertness. Brass could also be used, as could ceramic balls such as are used in paint grinding mills, or even dense balls made of a plastic such as Teflon, perhaps having a metal center.

As indicated above, the process of our invention finds its greatest application in the rotational molding of thermoplastic materials. However, it is not limited to molding of thermoplastics, and could be used for the compaction during rotational molding of any compactible material. The material need not be of thermoplastic nature. For example, it is known in the art to form carbon articles by mixing finely divided carbonaceous material such as coke or coal with a binder, shaping the mixture, and subsequently baking the item for a prolonged period to carbonize the binder. The binder can be a compactible material such as pitch or wax. Rotational molding of a relatively dry mixture of such a binder composition at room temperature is within the contemplation of our invention. Such application of our invention will, of course, take place at whatever temperature the mixture is compactible.

We have found that the process of our invention makes it possible to form thermoplastic articles having rigid physical requirements, beyond the properties of plastic materials heretofore produced by rotational molding.

In ordinary rotational molding of polyethylene, for example, it has previously been necessary to use polyethylene having a melt index ranging from about 4 to 22 (ASTM D1238-62T, condition E). Polyethylene having a melt index in this range is relatively fluid when molten, the higher the melt index number the greater the fluidity of the material. Polyethylene having a melt index below about 4 has not been sufficiently fluid for rotational molding purposes according to the prior art methods of rotational molding.

The melt index of a polyethylene is determined by the molecular weight, molecular weight distribution, and degree of cross-branching of the polyethylene chains. For

---

United States Patent Office 3,474,165
Patented Oct. 21, 1969

3,474,165
METHOD OF ROTATIONAL MOLDING
James L. Rakes, East Providence, R.I., and Robert L. Rees and Edward C. Held, Jr., Bartlesville, Okla., assignors to Phillips Petroleum Company, a corporation of Delaware
Filed Sept. 15, 1966, Ser. No. 579,585
Int. Cl. B28b 1/00; B29f 5/00; B29c 5/04
U.S. Cl. 264—312    6 Claims

ABSTRACT OF THE DISCLOSURE

In the rotational molding of plastic powder such as polyethylene, stainless steel balls and other spherical dense ball-like materials are charged to the rotational mold and the balls function to compact the plastic powder to form a fused wall of the article being molded.

---

This invention relates to rotational molding. In one aspect, it relates to a method for increasing the density of side walls of plastic items formed by rotational molding by putting a compacting element in the mold during the rotational molding. In another aspect, it relates to a method of rotational molding low melt index thermoplastic resins by providing compacting elements in the mold to work on the thermoplastic during molding whereby complete fusing of the plastic is obtained. In another aspect, it relates to a method of providing rotational molded articles of polyethylene having low temperature impact resistance and improved environmental stress cracking resistance by molding those items in a rotational mold in the presence of dense balls which aid in compacting and fusing, the walls of the items during rotation.

Rotational molding techniques have been highly developed over the past several years for production of items from vinyl plastisols. In rotational molding, a hollow mold is loaded with an exact amount of resinous material and is then rotated. Rotation can be on one axis only for the production of open-ended tubes, but it is more common to rotate the molds on two axes simultaneously. If the material being molded is thermoplastic in nature, the mold is heated while being rotated, and the flowable molten resin will become distributed evenly around all of the walls of the mold. While rotation continues, the mold is then moved into a cooling unit where the thermoplastic material gels. After the thermoplastic is sufficiently solid to be handled without distortion, the mold is moved to an unloading zone, where it is opened and the molded item stripped therefrom.

In general, the rate of speed of mold rotation does not exceed about 35 r.p.m. Depending upon the configuration of the item to be molded, the speed of rotation on each of the two axes may be different, and the ratio of the speeds of rotation on the two axes may be as great as 10:1.

As is known in the art, rotational molding produces hollow articles and hollow enclosed molded articles with excellent uniformity of wall thickness. Rotational molding is thus much more suitable for certain configurations of items than is the blow molding process wherein difficulty is experienced in producing parts with uniform wall thickness. This is particularly true with respect to large articles.

Heretofore, rotational molding has been limited to the use of resins which become relatively fluid when molten. Since the rotational molding technique depends upon the ability of the plastic material to distribute itself evenly around the walls of the mold at relatively low rotational speeds, it is obvious that a resin which does not flow readily cannot be successfully rotationally molded. Many resinous materials do not achieve the required fluidity for a given molecular weight, a lower melt index number is indicative of a more highly branched molecule. This higher degree of branching in turn gives the resin improved low temperature impact resistance and added resistance to environmental stress cracking.

A suitable gasoline tank, for example, which is required to have exceptionally good low temperature impact resistance and environmental stress cracking resistance, can be made of high density polyethylene having a melt index of about 0.3. Prior to our invention, however, it has been completely impossible to rotationally mold a polyethylene of this low melt index. By the process of our invention, however, such articles can be manufactured by rotational molding.

Other low melt flow thermoplastic resins suitable for use in our rotational molding process include copolymers of ethylene, homopolymers and copolymers of propylene and 1-butene, cellulose esters, homopolymers and copolymers of vinyl chloride, acrylonitrile-butadiene-styrene copolymers, homopolymers and copolymers of styrene, and virtually any other thermoplastic materials having low melt flow characteristics.

The number of balls or other compacting elements which should be placed into a particular mold will depend upon the size and shape of the article being molded and the particular plastic material being molded. It is generally considered preferable to have the mold approximately half full of relatively small diameter balls, but under a particular set of circumstances it could be possible to use a single large compacting element.

The operation of the process of our invention can be seen in the attached drawing which depicts the rotational molding of a thermoplastic wide mouth bottle by means of two-axes rotational molding. Mold 10 is composed of mold halves 10a and 10b. The mold is mounted in yoke 11 so that it may be rotated about a vertical axis on spindle 12. Power for rotation about the vertical axis is provided from drive means 13 through inner shaft 14, chain drive 15, shaft 16, and gears 17.

The secondary rotation is provided by rotating yoke 11 about a horizontal axis. This driving force is provided through drive connecting means 18 and spindle 19.

EXAMPLE I

A three-quart wide mouth bottle was fabricated using the equipment shown in the drawing. About 200 grams of powdered linear polyethylene having a melt index of 0.3 and sold under the trademark Marlex 5003 was charged to the mold. About 200 stainless steel balls of ½-inch diameter were also added to the mold. The mold was then closed except for a vent tube, which is standard in the art, and was mounted on the rotatable spindle. The mold was rotated about the horizontal axis at a speed of 16 r.p.m. and about the vertical axis at a speed of 8 r.p.m. The rotating mold was placed in a 650° F. oven for approximately 10 minutes, removed from the oven, and sprayed with cold water while still rotating for about 4 minutes. The mold was opened, the article removed, the mouth cut from the bottle, and the balls removed through the mouth. The walls of the bottle were found to be smooth, well compacted, and approximately 115 to 125 mils thick.

In this example, both the balls and the molds were coated with a standard mold release agent to minimize sticking. Various types of mold release agents are satisfactory, or the balls and mold may be coated with Teflon to provide easy release.

We claim:

1. In a rotational molding process wherein a plastic material is introduced into a mold and said mold is rotated simultaneously about two axes whereby said plastic is distributed against the walls of said mold to form a hollow enclosed molded article, the improvement which comprises introducing a plurality of non-adhering dense balls, as spherical compacting elements, into said mold to aid in compaction of said plastic against said walls, thereby providing a relatively dense smooth finished interior and exterior surface to the molded article.

2. Process of claim 1 wherein said mold is approximately half full of relatively small diameter balls of relatively high density as compared to the plastic.

3. Process of claim 1 wherein said plastic is a thermoplastic material, and said mold is first heated and subsequently cooled during rotation.

4. Process of claim 1 wherein said plastic is polyethylene having a melt index of less than 4.

5. Process of claim 4 wherein said compacting elements comprise a plurality of stainless steel balls.

6. Process of claim 1 wherein said plastic material is polyethylene having a melt index of about 0.3, said compacting elements are stainless steel balls.

References Cited

UNITED STATES PATENTS

| | | | |
|---|---|---|---|
| 2,285,497 | 6/1942 | Cuno | 264—312 |
| 3,222,439 | 12/1965 | Boloney | 264—310 X |
| 3,263,274 | 8/1966 | Pickles | 264—312 X |
| 1,979,415 | 11/1934 | Soso. | |
| 2,346,784 | 4/1944 | Pollack. | |

FOREIGN PATENTS 1,201,972  9/1965  Germany.

ROBERT F. WHITE, Primary Examiner

S. I. LANDSMAN, Assistant Examiner

U.S. Cl. X.R.

18—26; 25—30